United States Patent [19]

Bridgeford

[11] 4,062,981

[45] Dec. 13, 1977

[54] HUMIDIFYING AND SHIRRING ARTIFICIAL SAUSAGE CASING

[75] Inventor: Douglas J. Bridgeford, Champaign, Ill.

[73] Assignee: Teepak, Inc., Chicago, Ill.

[21] Appl. No.: 662,669

[22] Filed: Mar. 1, 1976

Related U.S. Application Data

[63] Continuation-in-part of Ser. No. 488,646, July 15, 1974, abandoned.

[51] Int. Cl.$^2$ ............................................. A23L 11/31
[52] U.S. Cl. ........................................ 426/278; 17/49; 426/138; 426/506
[58] Field of Search ................. 426/92, 105, 135, 140, 426/277, 278, 297, 302, 310, 312, 315, 321, 420, 506, 514; 17/42, 49, 51; 138/118.1

[56] References Cited

U.S. PATENT DOCUMENTS

| | | | |
|---|---|---|---|
| 3,222,192 | 12/1965 | Arnold | 17/49 |
| 3,262,789 | 7/1966 | Broumand | 426/420 |
| 3,818,947 | 6/1974 | Rose | 426/135 |
| 3,981,046 | 9/1976 | Chiui | 17/49 |

*Primary Examiner*—Norman Yudkoff
*Assistant Examiner*—Martin G. Mullen
*Attorney, Agent, or Firm*—Paul Shapiro; Joseph E. Kerwin; William A. Dittmann

[57] ABSTRACT

This invention relates to an improvement in a process for humidifying artificial sausage casings wherein a moisture-providing fluid is contacted with the inside wall of an unshirred portion of casing and the casing subsequently shirred. The improvement resides in employing as the moisture-providing fluid, water containing from about 0.5–5% by weight of a water-dispersible surfactant having sufficient lubricating qualities for preventing said casing from jamming on said shirring machine.

5 Claims, No Drawings

HUMIDIFYING AND SHIRRING ARTIFICIAL SAUSAGE CASING

BACKGROUND OF THE INVENTION

This application is a continuation-in-part application of my co-pending application Ser. No. 488,646 filed July 15, 1974, now abandoned.

Artificial sausage casings made of a variety of materials such as regenerated cellulose and collagen have achieved wide success as a synthetic substitute for natural casings in the processing of sausages. In the manufacture of these casings, the casings are extruded in the form of continuous tubing. For convenience of handling and shipping, the artificial sausage casings are shirred, from lengths ranging from 40-200 feet to a compacted length of a few inches, e.g., 4-30 inches. The extruded casings generally have moisture contents in the range of 10-14%. In order to shir these casings and to utilize these casings at the time of stuffing by the meat processor, the casings require higher moisture contents, e.g., a moisture content of 14-20% for regenerated cellulose casings and a moisture content of 24-26% for collagen casings. When the moisture content of the casings is below the aforementioned required ranges, the casings are too brittle and often fracture during shirring or stuffing.

DESCRIPTION OF THE PRIOR ART

To raise the moisture content of artificial sausage casings to render them amenable to shirring, it has been proposed to internally humidify artificial sausage casings while simultaneously lubricating the casing on a shirring machine by spraying a stream of water and a separate stream of lubricant onto the walls of the casing through the shirring mandrel. Humidification has been also accomplished by spraying water onto the shirring wheels or shirring belts and then causing these wheels or belts to contact the external surface of the casing. It has been proposed in these processes to add wetting agents in a proportion of from about 0.02-0.04% by weight of the solution to enhance the rate of wetting of the casing.

It has also been suggested to apply coatings to the interior of regenerated cellulose sausage casings during the shirring process. The coatings employed in these processes are applied to the casing for the purpose of improving the peelability of casings from sausages processed therein. In these particular processes, the lubricants employed are aqueous emulsions of vegetable, mineral or paraffin oil.

It has also been suggested to humidify artificial sausage casings after they have been shirred by spraying a mixture of water and lubricant over the surface of the shirred casing. The lubricants used in the mixture were aqueous emulsions of vegetable, animal or refined oils.

Other work shows a variety of coatings have been applied to the interior of artificial sausage casings of regenerated cellulose by spraying coating solutions through the shirring mandrel. These coating solutions typically contained from about 0.2-2% by weight of cetyl alcohol, acetylated monoglycerides of animal and vegetable fats, and $C_{16}$-$C_{18}$ fatty ketene dimers in a 12% glycerin-water solution.

SUMMARY OF THE INVENTION

The present invention relates to a process for humidifying artificial sausage casings wherein unshirred casing is inflated and passed over a shirring mandrel. immediately prior to shirring, humidification of the casing is effected by applying a moisture-providing liquid comprised of a mixture of water and from about 0.5 to about 5% of a relatively viscous surfactant having lubricating properties, to the internal wall of the casing to provide from about 0.015-0.15 mg. surfactant per in$^2$ of casing.

By the practice of the present invention, artificial sausage casings are produced with fewer defects in terms of damage on the shirring mandrel and fewer pinholes and greater elasticity to prevent breakage during stuffing. The castings humidified in accordance with the present invention can be shirred on conventional shirring machines without jamming as so often happens when aqueous emulsions of mineral oil and vegetable oil are employed. The process of the present invention also provides a casing which has substantially uniform moisture content which does not "grow" from its compacted state immediately after doffing.

PREFERRED EMBODIMENTS

The term "artificial sausage casing" as used herein includes synthetic casings formed from regenerated cellulose, fibrous casings such as those prepared by forming a tube of long fiber hemp paper, impregnating the tube with viscose and regenerating cellulose in and on the tube and synthetic casings formed from collagen, amylose, starch, or alginates.

The moisture-providing fluid for humidifying the casing is a substantially homogeneous mixture consisting of water and a water-dispersible surfactant having lubricating properties. By surfactants having lubricating properties, it is meant to refer to those surfactants which have the ability to absorb onto the surface of the casing wall so that when the casing is passed over the shirring mandrel the shear forces, at least in a substantial proportion, are absorbed by the surfactant. If the surfactant does not have sufficient lubricating properties, the casing will tend to stick or adhere to the shirring mandrel and jam the machine. Jamming is commercially undersirable in an appreciable degree, i.e., 1 per 10 reels, e.g., 50,000 to 60,000 feet.

The surfactant should be water-dispersible by simple agitation and in the absence of emulsifying agents. Also, it should remain in a stable dispersion when dispersed in water without agitation for a period of at least 4 hours. As stated previously, aqueous emulsions of lubricating oils have been used for lubricating the inner wall of artificial sausage casings so that the casing will slide across the mandrel, but these oil lubricants, because of their water-insolubility of non-dispersability, tend to retard the wetting of the casing by the water. It is imperative to wet the casing in the short time period available between contact with the aqueous spray and contact with the shirring wheels to avoid damage to the casing.

The water-dispersible surfactants of this invention not only enhance wet-out and spreading for permitting rapid humidification of the casing but also provide for a thin, uniform coating of a lubricant over the surface of the casing so that it will readily slide across the shirring mandrel. The surfactant, lubricant does not retard wet-out as is experienced with non-water dispersible lubricants.

The surfactant having lubricating properties is employed in the moisture-providing fluid in a proportion of about 0.5-5% by weight of the fluid. When a proportion of surfactant having lubricating properties is employed in less than about 0.5% by weight, there is insufficient surfactant applied to the surface of the casting to permit adequate lubrication of the casing for passage over the shirring mandrel. This aspect is distinguished from the prior art in that surfactants were added to water and sprayed onto the inner wall of the casing at a proportion of about 1/20 and quite often about 1/40 of that required for achieving the lubricating qualities required in the shirring operation, even though wet-out was effected. However, most of the surfactant employed in the prior art was for enhancing the humidication of the casing, e.e., the penetration of water into the casing wall and not lubrication.

When the proportion of surfactant having lubricating properties exceeds about 5% by weight of the moisture-providing fluid there is a tendency to load the casing with too much surfactant at the appropriate humidity level This loading causes the shirred strand to "grow" or become incoherent. By growing, it is meant that the strand does not remain in its compacted form and expands after doffing. The pleats do not adhere at high levels, and the strand may be incoherent, i.e., the pleats do not adhere to each other, and are difficult to handle without breaking. Broken strands are unacceptable for high speed automatic stuffing machines.

In practicing the invention, the preferred surfactant having lubricating qualities is sorbitan trioleate. This material is a nonionic surfactant which is a relatively viscous oily liquid and dispersible in water, even though it is insoluble therein. Although it is combined with water in proportions of 0.5-5% by weight and preferably 0.8-1.5% for application to the inner wall of the casing, the surfactant on the wall after humidification typically is from 0.015-0.15 mg/in.$^2$. At this level of surfactant, the casing has outstanding physical properties. The sorbitan trioleate produces casing having fewer pinholes and a higher resistance to breaking than has been achieved in any of the commercial processes. Another benefit of the surfactant is that the lubricating qualities of sorbitan trioleate are such that the frequency of jamming on the shirring machine for a sausage casing is less than about 1 per 50,000 to 60,000 feet of casing shirred. This is substantially lower than is achieved with casings humidified with water through the shirring mandrel employing an aqueous emulsion of mineral oil or vegetable oil as the lubricating medium.

A further advantage of sorbitan trioleate as a surfactant is that it enhances humidification of the casing for achieving excellent flexibility by the time the casing gets to the shirring wheels. As a result, the compacting of the casing into a plurality of pleats does not cause pinholes to develop. In fact, the frequency of pinhole occurrence in casings previously described is remarkably low. Coupled with the production of casings having relatively few pinholes is the production of a casing that does not have a tendency to grow after it has been shirred. Thus, the shirred strand can be readily handled without danger of breaking.

Although excellent results are obtained by spraying the inside wall of the artificial casing with the mixture of water and surfactant and particularly sorbitan trioleate, sometimes it is desirable during shirring to add additional lubricant with the air stream. Lubricants can also be sprayed on the external surface to reduce wear on the shirring wheels. Conventional lubricants for such use are vegetable and mineral oils in admixture with acetylated monoglycerides and polyoxyethylene monoesters, e.g., polyoxyethylene 400 monostearate.

The following examples are provided to illustrate the preferred embodiments of the invention. All percentages are expressed as weight percentages.

EXAMPLE 1

Artificial sausage casings of regenerated cellulose were substantially simultaneously humidified and lubricated during the shirring process by employing the apparatus described in U.S. Pat. No. 3,451,827. Although this type of apparatus is preferred as it includes a spray system for applying the fluid to the inner wall of the casing, other apparatus permitting the introduction of a moisture-providing fluid as a thin coating on the inner wall of the casing during shirring can be employed.

Six moisture-providing liquids were prepared by dispersing 0.25%, 0.5%, 1%, 1.5%, 5% and 10% sorbitan trioleate in water solutions. Reels of dry, i.e., 10% water, regenerated cellulose casing flat stock having a diameter of 24 mm. and a wall thickness of about 1.10 mils were introduced over a shirring mandrel and shirred. As the casings passed over the mandrel, the inner wall was contacted with a fine spray of the above liquids. Each casing was coated with about 3 mg. moisture-providing liquid per inch$^2$ of casing. Each shirred strand of casing contained 125 feet of casing and had from about 0.0075 mg. to about 0.3 mg. sorbitan trioleate per inch$^2$ of casing. The moisture content of the casing was about 18% plus or minus 2%.

The casing shirred very smoothly at the 0.5%, 1%, 1.5%, 5% and 10% levels and the casing did not jam in approximately 50,000 feet shirred. The casings performed well in the field, i.e., in stuffing, but the strands coated with the fluid at 0.25% and 10% sorbitan trioleate did not perform as well as the strands having 0.5%, 1.0%, 1.5% and 5% level. At the 0.25% level there seemed to be more pinholes in the castings and more problems in shirring, e.g., breaking. Probably this was due to the low concentration of lubricant on the wall of the casing. The casing with the 10% sorbitan trioleate level processed well but there was a tendency for the shirred strand to grow.

Best shirring results were noted at the 1-1.5% sorbitan trioleate level. Field stuffing results were noted at the 1-1.5% sorbitan trioleate level. Field stuffing tests showed that at the 1% level the frequency of breakage in one plant was 1 defect for 1400 strands tested. Another plant showed 30 defects for 200 strands tested. Based on a series of stuffing tests in the field ranging from the 1400 strands with 1 defect at one plant at the best to another plant of 200 strands tested and 30 defects the results obtained conclusively showed a reduced frequency of breakage at the stuffing operation as compared to commercially available regenerated cellulose casings.

Although results varied within the plants, the consensus was that the casings in general performed much better than commercially available cellulose casings produced by prior art humidification techniques.

EXAMPLE 2

Shirred strands of casing are prepared by spraying a moisture-providing fluid consisting of 1% sorbitan trioleate in water onto the inner wall of cellulose casing as described in Example 1. The sorbitan trioleate was present in a proportion of about 0.1 mg. per square inch of casing and the moisture content of the casing was raised to about 18% by weight. Acetylated monoglyceride and 1% polyoxyethylene 400 monostearate was added with the air spray for inflating the casing as it was shirred and was applied at a concentration from about 0.3 g per 100 foot strand of 24 mm diameter casing.

Typical routine stuffing tests with several thousand stands casing tested showed about a 0.2–0.4% breakage. Normally, casing humidified by prior art techniques shows about a 2–3% average breakage under similar test conditions.

EXAMPLE 3

The procedure of Example 1 was repeated with the exception that 40–50 foot length strands of collagen casing were used in place of regenerated cellulose casing. The untreated collagen casing had a diameter of 21 mm, a wall thickness of about 27 mils and a moisture content of 8–12%. The casing strand was introduced over a shirred mandrel and shirred. As the casing passed over the mandrel, the inner wall was contacted with a water solution containing 1% sorbitan trioleate. The casing shirred smoothly and was determined to have a moisture content in excess of 24%.

What is claimed is:

1. In a process for humidifying an artificial sausage casing on a shirring machine wherein a moisture-providing fluid is contacted with the inside wall of unshirred casing and the casing subsequently shirred, the improvement which comprises employing as said moisture-providing fluid a mixture comprising water and from about 0.5–5% of a surfactant having lubricating properties which is applied to said casing in a proportion to provide from about 0.015 to 0.15 mg. surfactant per square inch of casing.

2. The process of claim 1 wherein the artificial casing is formed from regenerated cellulose.

3. The process of claim 1 wherein the artificial casing is formed from collagen.

4. The process of claim 1 wherein said surfactant is sorbitan trioleate.

5. The process of claim 2 wherein said sorbitan trioleate in said moisture-providing liquid is from about 0.8–1.5%.

* * * * *

REEXAMINATION CERTIFICATE (723rd)

United States Patent [19]

Bridgeford

[11] B1 4,062,981

[45] Certificate Issued Jul. 14, 1987

[54] HUMIDIFYING AND SHIRRING ARTIFICIAL SAUSAGE CASING

[75] Inventor: Douglas J. Bridgeford, Champaign, Ill.

[73] Assignee: Teepak Investments, Inc., Chicago, Ill.

Reexamination Reqs:st:
No. 90/000,983, Apr. 9, 1986
No. 90/001,070, Aug. 18, 1986

Reexamination Certificate for:
Patent No.: 4,062,981
Issued: Dec. 13, 1977
Appl. No.: 662,669
Filed: Mar. 1, 1976

Related U.S. Application Data

[63] Continuation-in-part of Ser. No. 488,646, Jul. 15, 1974, abandoned.

[51] Int. Cl.$^4$ .................... A22C 13/02; A23L 1/31
[52] U.S. Cl. .................... 426/278; 17/49; 426/138; 426/506
[58] Field of Search ............... 426/92, 105, 135, 140, 426/277, 278, 297, 302, 310, 312, 315, 321, 420, 506, 514; 17/42, 49, 51; 138/118.1

[56] References Cited

U.S. PATENT DOCUMENTS

| 2,462,331 | 0/0000 | Myers | 260/23 |
|---|---|---|---|
| 2,561,010 | 7/1951 | Carson | 206/45.31 |
| 3,451,827 | 6/1969 | Bridgeford | . |
| 3,898,348 | 8/1975 | Chiu et al. | 426/413 |
| 3,981,046 | 9/1976 | Chiu | . |

FOREIGN PATENT DOCUMENTS

38-16720 9/1963 Japan .

OTHER PUBLICATIONS

1972 Chemical Week Buyer's Guide, McGraw-Hill, Oct. 27, 1971.
McCutcheon's Detergents and Emulsifiers 1971 Annual, p. 165.
Sisley et al., Encyclopedia of Surface Active Agents, 1964, pp. 448, 485.
The Condensed Chemical Dictionary, 5th Ed. (1961), pp. 526–527, and p. 910.

*Primary Examiner*—Arthur L. Corbin

[57] ABSTRACT

This invention relates to an improvement in a process for humidifying artificial sausage casings wherein a moisture-providing fluid is contacted with the inside wall of an unshirred portion of casing and the casing subsequently shirred. The improvement resides in employing as the moisture-providing fluid, water containing from about 0.5–5% by weight of a water-dispersible surfactant having sufficient lubricating qualities for preventing said casing from jamming on said shirring machine.

B1 4,062,981

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 4 and 5 are determined to be patentable as amended.

Claims 2 and 3, dependent on an amended claim, are determined to be patentable.

1. In a process for humidifying an artificial sausage casing on a shirring machine wherein a moisture-providing fluid is contacted with the inside wall of unshirred casing and the casing subsequently shirred, the improvement which comprises employing as said moisture-providing fluid a mixture comprising water and from about 0.5-5% of a *water-dispersible* surfactant having lubricating properties which is applied to said casing in a proportion to provide from about 0.015 to 0.15 mg. surfactant per square inch of casing.

4. *In a process for humidifying an artificial sausage casing on a shirring machine wherein a moisture-providing fluid is contacted with the inside of unshirred casing and the casing subsequently shirred, the improvement which comprises employing as said moisture-providing fluid a mixture comprising water and from about 0.5-5% of* [The process of claim 1 wherein said surfactant is] sorbitan trioleate *having lubricating properties which is applied to said casing in a proportion to provide from about 0.015 to 0.15 mg. surfactant per square inch of casing.*

5. The process of claim [2] *4* wherein said sorbitan trioleate in said moisture-providing liquid is from about 0.8–1.5%.

* * * * *